United States Patent
Byers et al.

(10) Patent No.: US 7,941,633 B2
(45) Date of Patent: May 10, 2011

(54) HASH OPTIMIZATION SYSTEM AND METHOD

(75) Inventors: Marcy Evelyn Byers, Rochester, MN (US); Ronald Ernest Freking, Rochester, MN (US); Ryan Scott Haraden, Rochester, MN (US); David Alan Shedivy, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 662 days.

(21) Appl. No.: 11/958,704

(22) Filed: Dec. 18, 2007

(65) Prior Publication Data

US 2009/0157972 A1 Jun. 18, 2009

(51) Int. Cl.
*G06F 12/00* (2006.01)
*G06F 13/00* (2006.01)
*G06F 13/28* (2006.01)

(52) U.S. Cl. ............... 711/216; 711/133; 711/159

(58) Field of Classification Search ............ 711/216
See application file for complete search history.

(56) References Cited

U.S. PATENT DOCUMENTS

| | | | | |
|---|---|---|---|---|
| 5,269,013 A * | 12/1993 | Abramson et al. | ............ | 711/170 |
| 6,804,768 B2 * | 10/2004 | Moyer | ............ | 711/216 |
| 2002/0147888 A1 * | 10/2002 | Trevathan | ............ | 711/133 |
| 2003/0212865 A1 * | 11/2003 | Hicken et al. | ............ | 711/135 |
| 2006/0107024 A1 * | 5/2006 | Cypher | ............ | 711/216 |

* cited by examiner

*Primary Examiner* — Brian R Peugh
*Assistant Examiner* — Prasith Thammavong
(74) *Attorney, Agent, or Firm* — Toler Law Group (57) ABSTRACT

A computer implemented method, apparatus and program product automatically optimizes hash function operation by recognizing when a first hash function results in an unacceptable number of cache misses, and by dynamically trying another hash function to determine which hash function results in the most cache hits. In this manner, hardware optimizes hash function operation in the face of changing loads and associated data flow patterns.

20 Claims, 3 Drawing Sheets

HASH OPTIMIZATION SYSTEM AND METHOD

FIELD OF THE INVENTION

The present invention generally relates to data processing systems and computer memory usage, and more particularly, to cache memory access and management within computing devices.

BACKGROUND OF THE INVENTION

A cache comprises a memory that holds recently accessed data in order to speed up subsequent access to the same data. Caches are routinely deployed on microchips between processors and main memory for this purpose. More particularly, a cache generally includes a portion of memory made of high-speed Static Random Access Memory (SRAM), contrasted with the relatively slower and cheaper Dynamic Random Access Memory (DRAM) used for main memory. Caching is effective because most programs repeatedly access the same data or instructions. By keeping as much of this information as possible in SRAM, the computing device may avoid accessing the slower DRAM. A cache maintains tags, or index information, to manage whether data stored in entries of the cache is valid and among data in the main memory.

Some caches are built into the architecture of microprocessors. Such internal caches are often called Level 1 (L1) caches. Many computing devices also come with a relatively larger, external cache memory, called Level 2 (L2) caches. L2 caches are positioned between the CPU and the DRAM. Disk caching works under the same principle as memory caching, but instead of using high-speed SRAM, a disk cache uses conventional main memory. The most recently accessed data from the disk (as well as adjacent sectors) is stored in a memory buffer. When a program needs to access data from the disk, it first checks the disk cache to see if the data is there. Disk caching can dramatically improve the performance of applications, because accessing a byte of data in RAM can be thousands of times faster than accessing a byte on a hard disk.

In conventional systems, manufactures design the structure of a device's cache and associated hardware programming around an expected data flow, or traffic pattern. Data flow generally relates to an order or set of rules according to which data is processed. Communication protocols have different traffic flow patterns, and consequently, different data handling requirements for devices. For instance, Ethernet devices may require processing suited for a random distribution of packets, while the traffic pattern of a hard drive may be a more predictable stream of data.

As such, computing devices are conventionally designed to include a dedicated hash function configured to most efficiently parse the particular data flow associated with an expected protocol. A hash function is an operation that maps the addresses of the data from a main memory to the data entries of the cache. A device ideally uses a hash function tailored to the specific data format and sequencing of the traffic pattern to locate data and thereby meet most performance goals. For instance, a device with a Small Computer System Interface (SCSI) port may be configured with a particular hash function against the expectation of receiving Serial Bus Protocol data. Another computing device may be manufactured with a hash function configured to most efficiently receive data packets formatted according to a data flow associated with the Ethernet protocol.

Predicting what hardware should be used as the expected, critical data flow pattern has become increasingly complex. Cellular phones, audio and video file players, Personal Digital Assistants (PDA's) and other devices are routinely expected to handle increasing loads having different functions and features. Input/Output (I/O) microchips in such hybrid devices must manage memory in the face of a multitude of functions that include both video and audio streams, among others, each of which present a different data flow pattern. This industry trend is at odds with the fact that devices hardwired for a single, critical data flow.

The cache and hash function are consequently inefficient when exposed to data flows that stray from the particular, expected traffic pattern. For instance, a hash function under such conditions may point to only a small subset of a cache. An unacceptable amount of cache misses and other inefficiencies can result from the hash function not being specifically configured for the different traffic formats. As such, using the wrong hash function can seriously and detrimentally impact performance.

Microchip designers make some concessions to support different workloads. For instance, some microchips include caches with increased sizes, so that even a bad hash will work most of the time. This conventional remedy, however, forces each design to accept the performance loss on other types of workloads. Larger cache sizes additionally translate into increased manufacturing costs.

For at least these reasons, there exists a need for an improved method and system for managing a cache.

SUMMARY OF THE INVENTION

The present invention provides an improved computer implemented method, apparatus and program product for managing a cache using hash function. Aspects of the invention may include using a first hash function to access an entry in a cache, and analyzing a performance attribute of the first hash function. A second hash function may be selected based upon the analysis of the performance attribute, and the second hash function may be used to access the cache. Exemplary performance attributes may relate to an access attempt, a cache miss, and/or a cache hit. Where so configured, aspects of the cache management and hash function optimization may be implemented in hardware for increased efficiency.

In accordance with other aspects of the invention, a performance attribute of the second hash function may be additionally analyzed. Moreover, the automatic selection of the second hash function may include a comparison of the performance attribute of the first hash function to a performance attribute of the second hash function, or a stored reference value.

Where desired, embodiments consistent with the invention may include a warm-up period for the first hash function prior to analyzing the performance attribute of the first hash function. Other features of embodiments may include a background flush algorithm configured to invalidate an entry of the cache, and determining if an entry of the cache that is correlated to an old hash function has been flushed.

The first and/or second hash function may be stored, and aspects of the invention may automatically switch between using the first and second hash functions. For instance, embodiments may determine if using the second hash function results in a cache hit, and if not, may use the first hash function.

These and other advantages and features that characterize the invention are set forth in the claims annexed hereto and forming a further part hereof. However, for a better understanding of the invention, and of the advantages and objectives attained through its use, reference should be made to the Drawings, and to the accompanying descriptive matter, in which there are described exemplary embodiments of the invention.

DETAILED DESCRIPTION

Embodiments consistent with the underlying principles of the present invention may optimize hash function operation by dynamically recognizing when a first hash function results in an unacceptable number of cache misses. Another hash function may be tried automatically to determine which hash function results in the most cache hits. In this manner, embodiments realized in hardware may optimize hash function operation in the face of changing loads and associated data flow patterns.

Aspects of the invention produce surprising efficiency by focusing on how the cache is accessed, rather than on industry trends that relate to manipulating cache size. That is, the static nature of conventional computing devices does not permit efficient cache utilization. Embodiments of the present invention address this problem by enabling hardware to automatically adjust the hash function to reach optimal cache hit rates. This feature achieves better results than those of a static hash function that performs optimally for only one type of data flow.

Figure 1:
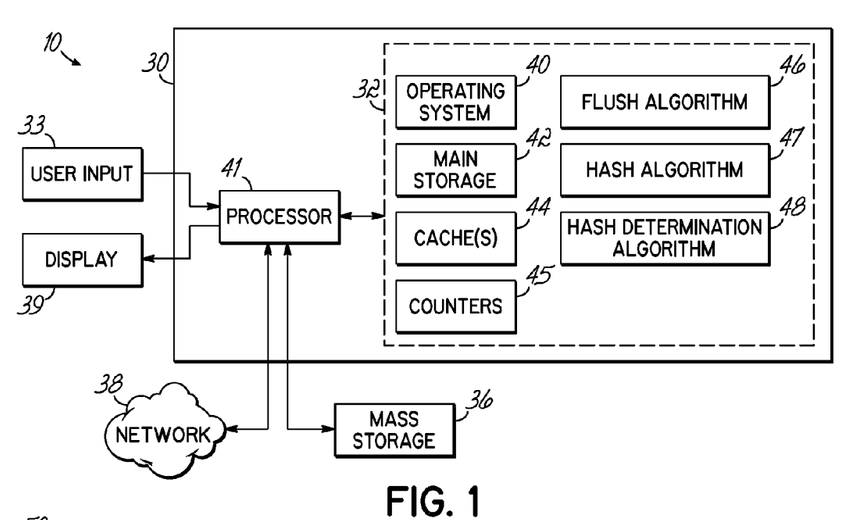
FIG. 1 shows a block diagram of a computer system configured to optimize hash function utilization in a cache and in accordance with the principles of the present invention.

While the principles of this invention do not limit its forum or application, one desirable hash function optimization embodiment capitalizes on the structure available through the system exemplified in FIG. 1. FIG. 1 generally shows a block diagram of a networked computer device, or system 10, configured to optimize cache functionality as it pertains to hash functions. The system 10 more particularly comprises one or more client computer(s) 30 coupled to a network 38. Network 38 represents a networked interconnection, including, but not limited to local area, wide area, wireless, and public networks (e.g., the Internet). Moreover, any number of computers and other devices may be networked through network 38, e.g., multiple servers.

Computer system 10 will hereinafter also be referred to as an "apparatus," "computer," "tool," "device," or "system," although it should be appreciated that the terms may respectively include many other controller configurations. Moreover, while only one network interface device is shown in FIG. 1, any number of computers and other devices may be networked through network 38. In still another embodiment, the system 10 may be implemented in a standalone configuration, i.e., disconnected from another computer or computer network.

Computer device 30 typically includes at least one processor 41 coupled to a memory 32. Processor 41 may represent one or more processors (e.g., central processing units, microprocessors). Memory 32 may represent the SRAM devices comprising the main storage 42 of computer device 30, as well as any supplemental levels of memory, e.g., cache memories, non-volatile or backup memories (e.g., programmable or flash memories), read-only memories, etc. In addition, memory 32 may be considered to include memory storage physically located elsewhere in computer device 30, e.g., any cache memory present in processor 41, as well as any storage capacity used as a virtual memory, e.g., as stored within a database 37, or on another computer coupled to computer device 30 via network 38.

Computer device 30 also may receive a number of inputs and outputs for communicating information externally. For interface with a user, computer device 30 typically includes one or more input devices 33 (e.g., a keyboard, a mouse, a trackball, a joystick, a touch pad, iris/fingerprint scanner, and/or a microphone, among others). The computer device 30 additionally includes a display 39 (e.g., a CRT monitor, an LCD display panel, and/or a speaker, among others). It should be appreciated, however, that with some implementations of the computer device 30, direct user input and output may be unsupported by the computer, and interface with the server computer device 30 may be implemented through a computer or workstation networked with the computer device 30.

For additional storage, computer device 30 may also include one or more mass storage devices 36 configured to store, for instance, the database 37. Exemplary devices 36 can include: a floppy or other removable disk drive, a flash drive, a hard disk drive, a direct access storage device (DASD), an optical drive (e.g., a CD drive, a DVD drive, etc.), and/or a tape drive, among others. Furthermore, computer device 30 may include an interface with one or more networks (e.g., a LAN, a WAN, a wireless network, and/or the Internet, among others) to permit the communication of information with other computers coupled to the network 38. It should be appreciated that computer device 30 typically includes suitable analog and/or digital interfaces between processor 41 and each of components 32, 33, 36, 38 and 39.

Computer device 30 may operate under the control of an operating system 40, and executes various computer software and hardware applications, components, programs, modules, e.g., a main memory storage 42, cache(s) 44, cache miss, access and loop counters 45, background flushing algorithm 46, hash functions 47, and hash determination algorithm 48, among others. As discussed herein, a hash function 47 may provide the hardware of the system 10 with a mechanism for converting physical memory addresses into a cache index, generally by storing tags associated with the addresses. That is, hash functions 47 may be used to index into a cache 44. When data is found in the cache 44, it is called a cache hit, and the effectiveness of a cache 44 and hash function 47 are linked to the hit rate.

Various applications, components, programs, markers, modules, etc. may also execute and/or be stored on one or more processors and/or memory/caches of another computer coupled to computer device 30 via a network 38, e.g., in a distributed or client-server computing environment, whereby the processing required to implement the functions of a computer program may be allocated to multiple computers over a network.

While a cache 44 is shown as being distinct from the processor 41 in the block diagram of FIG. 1, it should be understood for purposes of this specification that caches consistent with embodiments of this invention may alternatively be included within one or more processors. Hardware caches use simple rules amenable to implementation in circuitry, and in this manner, embodiments consistent with the invention may keep the instruction and data caches coherent in hardware. Moreover, while computer device 30 may include a networked computer device, other embodiments of the device 30 may include relatively smaller and more focused computing applications or components, such as a cellular phone, a PDA or a microchip.

Referring more particularly to FIG. 1, when the processor 41 issues a request for an address in the main storage 42, the system 10 may determine whether the address is included within the cache 44. If the address is included within the cache 44 (e.g., a cache hit), data stored at the address in the cache 44 may be transferred to the processor 41. However, if the address is determined to not be included within the cache 44 (e.g., a cache miss), an entry containing the address may be extracted, or fetched from the main storage 42 and copied, or written to the cache 44. The requested data stored at the address in the main storage 42 may be transferred to the processor 41. As used herein, entries (e.g., lines, blocks or sets) may be units in which data may be written to or read from the cache 44 (e.g., 32 bytes, 64 bytes, etc.).

In general, the routines executed to implement the embodiments of the invention, whether implemented in hardware, as part of an operating system, or as a specific application, component, program, engine, process, programmatic tool, object, module or sequence of instructions, or even a subset thereof, may be referred to herein as a "algorithm," "function," "program code," or simply "program." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. One of skill in the art should appreciate that embodiments consistent with the principles of the present invention may nonetheless use program code resident at only one, or any number of locations.

Moreover, while the invention has and hereinafter will be described in the context of fully functioning computer systems, those skilled in the art will appreciate that the various embodiments of the invention are capable of being distributed as a program product in a variety of forms, and that the invention applies equally regardless of the particular type of computer readable, signal bearing media used to actually carry out the distribution. Examples of signal bearing, computer readable media include, but are not limited to tangible, recordable type media such as volatile and non-volatile memory devices, floppy and other removable disks, hard disk drives, magnetic tape, optical disks (e.g., CD-ROMs, DVDs, etc.), among others, and transmission type media such as digital and analog communication links.

In addition, various program code described hereinafter may be identified based upon the application or engine within which it is implemented in a specific embodiment of the invention. However, it should be appreciated that any particular program nomenclature that follows is used merely for convenience, and thus the invention should not be limited to use solely in any specific application or engine identified and/or implied by such nomenclature.

Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

The various software components and resources illustrated in FIG. 1 may be implemented in a number of manners, including using various computer software applications, routines, components, programs, objects, modules, data structures and programs. Those skilled in the art will further recognize that the exemplary environments illustrated in FIG. 1 are not intended to limit the present invention. Indeed, those skilled in the art will recognize that other alternative hardware and/or software environments may be used without departing from the scope of the invention.

Figure 2:
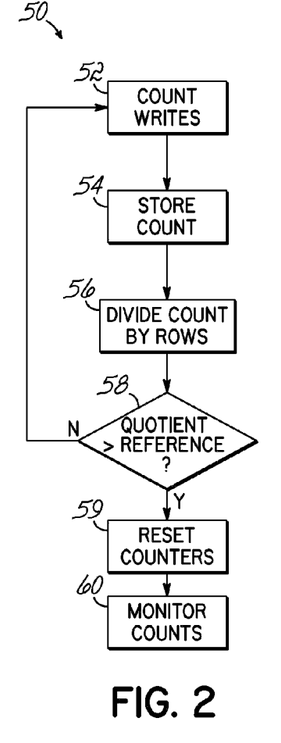
FIG. 2 shows a flowchart having steps used by the system of FIG. 1 for determining when a hash function is ready to be analyzed in accordance with the principles of the present invention.

FIG. 2 is a flowchart 50 having steps used by the system 10 of FIG. 1 for determining when a hash function 47 is ready to be analyzed. In a sense, the processes of the flowchart 50 are suited to allow the processes of the hash function 47 to warm-up. This period of warm-up may help ensure that the hash function 47 has had adequate time to begin performing. This feature, in turn, may result in a limited number of cache misses attributable to a transition to the current hash function 47. For instance, a transition issue may involve the cache 44 requiring time to initially populate empty cache lines.

At the conclusion of the warm-up period, applicable registers, or counters 45, may be reset in anticipation of monitoring the performance of the hash function 47. For instance, the access and miss counts may be set to zero. An access count may correspond to the number of attempts by the system 10 to access cache entries and the miss count, as implied, may correspond to a number of times of those attempts that failed to access data from the cache 44. Put another way, a cache miss represents an instance where the data was not returned to a requester with the aid of the cache 44.

Turning more particularly to the steps of a flowchart 50, the system 10 may detect and count at block 52 the number of access attempts. The system 10 may store and maintain the access count at block 54. For purposes of mathematically scaling the number of access counts, the system 10 may divide at block 56 the count by the number of rows in the cache 44.

At block 58, the system 10 may determine if the resultant quotient from block 56 is greater than a reference value. An exemplary reference value may be predetermined based on empirical results. If the quotient is smaller than the reference value, then the system 10 may continue to count the number of access attempts back at block 52.

Alternatively, in response to the quotient being greater than the reference value at block 58, the system 10 may reset the access and cache miss counters 45 at block 59 in anticipation of monitoring them at block 60. This condition at block 58 may coincide with the hash function 47 having had sufficient time to warm-up. As described herein, a loop counter 45 may additionally be reset at block 59. An embodiment of the loop counter 45 may be used to prevent the system 10 from thrashing and/or continuing to retry previously analyzed hash functions 47.

Figure 3:
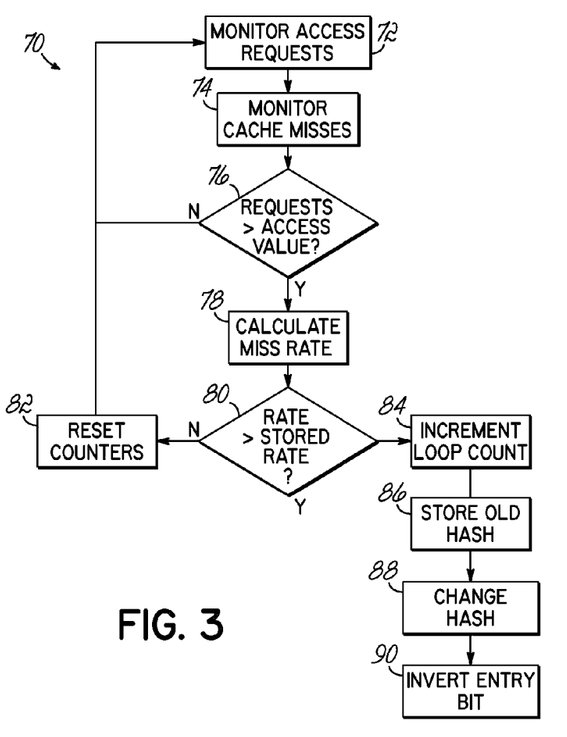
FIG. 3 shows a flowchart having steps executable by the system of FIG. 1 for automatically selecting an optimal hash function in accordance with the principles of the present invention.

FIG. 3 shows a flowchart 70 having steps executable by the system 10 of FIG. 1 for automatically selecting an optimal hash function 47. At block 72 the flowchart 70, the system 10 may monitor access requests. The system 10 may concurrently or otherwise monitor cache misses at block 74.

At block 76 of the flowchart 70, the system 10 may determine if the monitored access request count is greater than some preset access value. If not, then the system 10 may continue at block 72 to monitor access requests. Alternatively, if at block 76 the number of requests is greater than the access value, then the system 10 may calculate at block 78 the cache miss rate.

Should the system 10 determine at block 80 that the cache miss rate is less than some predetermined and stored rate, the system 10 at block 82 may reset the counters 45. The system 10 may continue to monitor the access requests at block 72.

If at block 80 the cache miss rate is alternatively determined to be larger than the stored rate, then the system 10 may increment at block 84 the loop counter 45. In one embodiment, a loop count may correspond to a number of times that the system 10 has cycled through hash functions 47. This loop counter 45 may be incremented at block 84, as is described below in greater detail.

The system 10 may store at block 86 the old hash function 47 for potential, future use. The system 10 may additionally change, or switch, to a new hash function 47, as shown at block 88 of flowchart 70. The system 10 may also invert at block 90 the cache entry bit, or hash indicator bit. As discussed herein, inversion of the cache entry bit may function to designate to the background flush algorithm 46 that the cache entry should be preserved.

Figure 4:
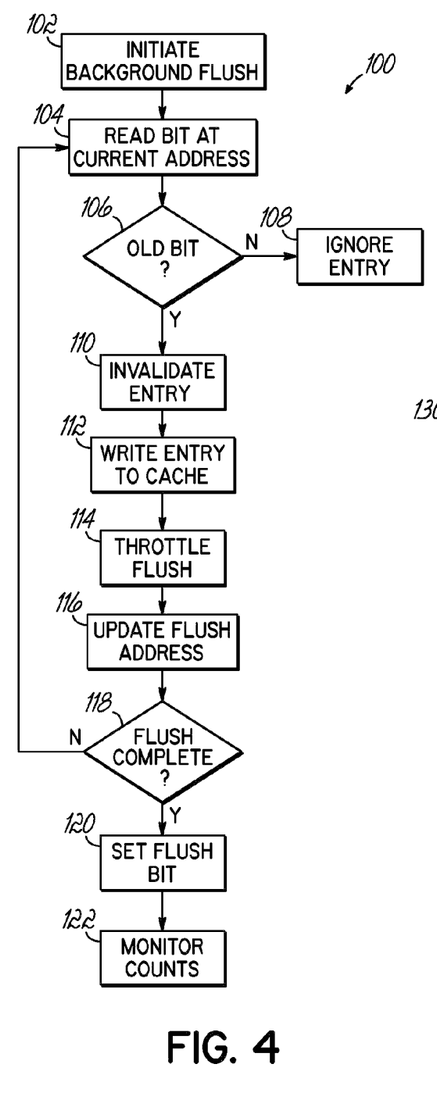
FIG. 4 shows a flowchart having steps executable by the system of FIG. 1 for performing a background flushing operation on invalid cache entries in accordance with the principles of the present invention.

FIG. 4 shows a flowchart 100 having steps executable by the system 10 of FIG. 1 for performing a background flushing operation on invalid cache entries. Turning more particular to the steps of the flowchart 100, the system 10 at block 102 may initiate the background flush algorithm 46. The initiation processes may include setting a register or other indicator showing that a background flush operation is active. For instance, a background flush algorithm-in-progress bit may be set to "1." Another initiation process may include setting the address of the background flush algorithm 46 to a starting point within the cache.

The background flush algorithm 46 may at block 104 read the cache bit entry at the current address. For instance, the background flush algorithm 46 may read a validation bit(s) of the cache entry bit(s) at the address at the initial, starting address. The validation bit may comprise part of the cache entry, and may indicate with which hash function the cache entry is associated. For instance, all entries having a "1" as their first bit may be associated with a first hash function, while the system 10 may have all entries associated with a second hash function begin with a "0."

If the hardware executing the background flush algorithm 46 determines at block 106 that the invalidation cache bit has been inverted or is otherwise associated with the new hash function 47, then the background flush algorithm 46 may ignore the entry at block 108. Alternatively at block 110, the background flush algorithm 46 may invalidate the entry should the system 10 determine that the entry is associated with the old hash function 47. Invalidation processes may include inverting the cache entry bit and/or writing the entry back as invalid, or a clear entry. As shown in FIG. 4, the system 10 may write at block 112 the entry to the cache 44.

Where so configured, the system 10 may throttle at block 114 the background flush algorithm 46. Throttling processes may include slowing or stalling the background flush algorithm 46 for some preset amount of time to avoid invalidating the entire cache at too quick a pace. These throttling processes may help the transition between the hash functions 47 by gradually flushing the cache entries, i.e., not flushing them all at once.

The system 10 may update at block 116 the background flush address. The updated flush address may correspond to a next row or other entry of the cache 44. Until the background flush algorithm 46 is complete at block 18, the background flush algorithm 46 may continue to read and cycle through cache entries beginning back at block 104.

Where the flush operation is alternatively complete at block 118, the background flush algorithm in-progress bit may be set to "off," or "0" at block 120. The system 10 may monitor counts at block 122. As such, block 122 may generally correspond to processes relating to those described in connection with FIG. 3.

Figure 5:
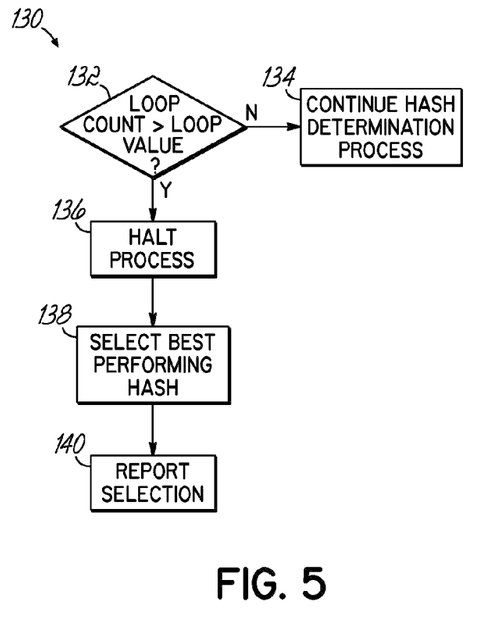
FIG. 5 shows a flowchart having steps configured to be executed by the system of FIG. 1 for maintaining the loop counter in accordance with the principles of the present invention.

FIG. 5 includes a flowchart 130 having steps configured to be executed by hardware of the system 10 for maintaining the loop counter 45. Turning more particularly to the steps of the flowchart 130, the system 10 may determine at block 132 if the loop count is greater than a preset loop value. If not, then the system 10 may continue the hash optimization process at block 134.

Alternatively, should the loop count at block 132 be greater than the preset loop value, the system 10 may halt the process at block 136. The condition of the current loop count being greater than the preset loop value may indicate that the system 10 has sequenced through the available hash functions 47.

The system 10 may select at block 138 the best performing hash function 47. Such a selection may be based on recorded performance attributes associated with each hash function 47. Where so configured, the system 10 may report at block 140 the selection of a best performing hash function 47, or alternatively, that no satisfactory hash function 47 could be determined.

Figure 6:
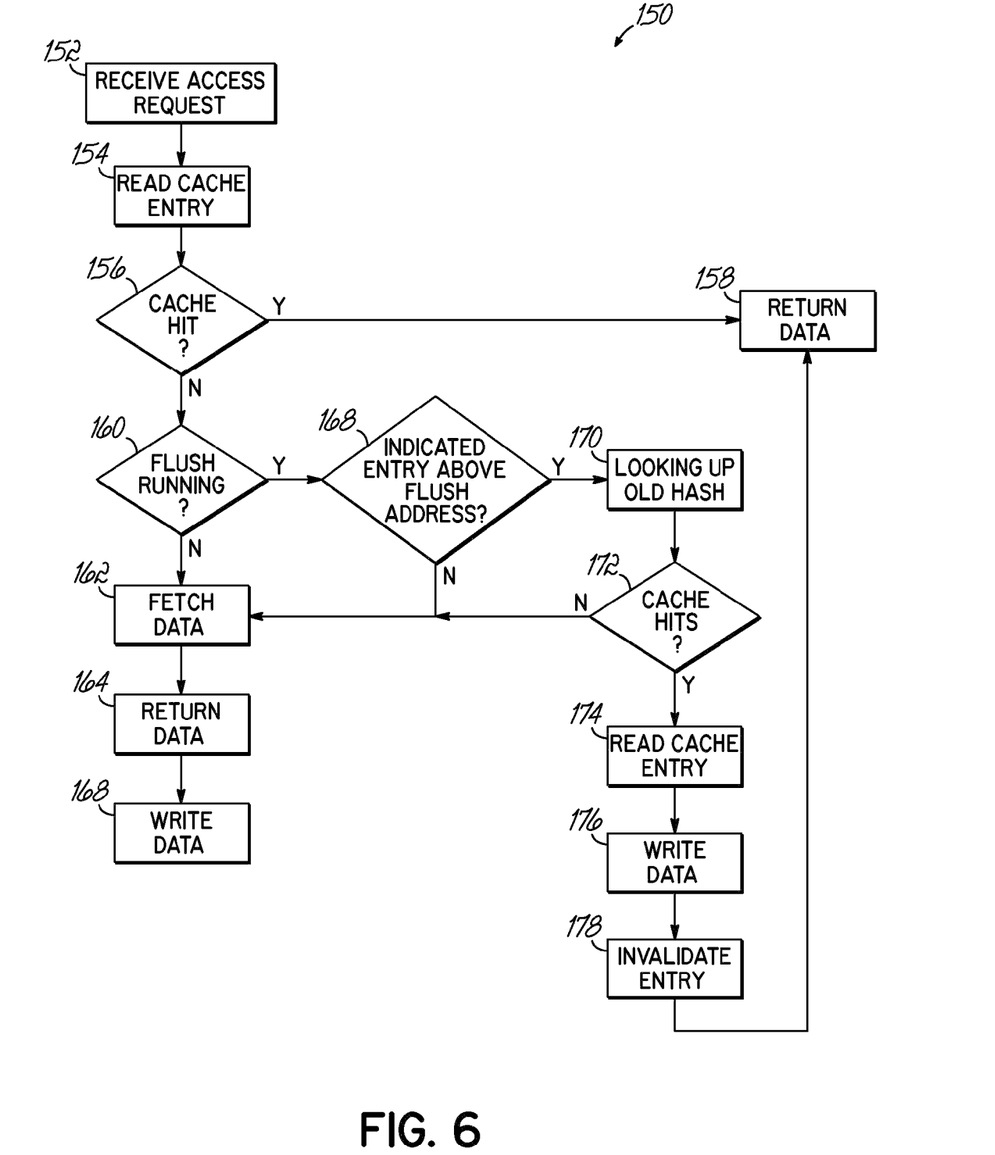
FIG. 6 shows a flowchart having steps executable by the system of FIG. 1 for managing caching operations in accordance with the principles of the present invention.

FIG. 6 shows a flowchart 150 having steps executable by the system 10 of FIG. 1 for managing caching operations in accordance with the principles of the present invention. The flowchart 150, in one sense, shows steps for coordinating operation of the background flush algorithm 46 and the management of the old and new hash functions 47. As with the other flowcharts described herein, steps of the flowchart 150 may be augmented, omitted and/or eliminated in accordance with embodiments consistent with the underlying principles of the present invention.

Turning more particularly to the steps of the flowchart 150, the system 10 may receive at block 152 an access request. In response to the receipt of the access request, the system 10 may at block 154 read a corresponding cache entry. The system 10 may attempt to locate the cache entry using the current hash function 47.

If the system 10 determines at block 156 that a cache hit has occurred, then the data associated with the hit may be returned at block 158 to the requester. In one embodiment, a cache hit may be determined when the hash bit address in the cache is the same as the current hash from the hash function 47 and/or the validation bit of the cache entry is valid.

Alternatively at block 160, where a cache miss has occurred, the system 10 may determine if the background flush algorithm 46 is running. If not, then the system 10 may at block 162 fetch the data. Fetching processes may include an external process also on the microchip that is configured to retrieve the requested data from memory 36, 42.

The data may be returned at block 164 to the requester, and the system 10 may write at block 166 the new data using the current hash function 47. Of note, these write processes may dually function to invalidate any old hash function entries pertaining to the requested data.

Where the background flush algorithm 46 is not running at block 160, the system 10 may at block 168 determine if the indicated cache entry is above the current background flush algorithm address, or pointer. If not, then the data has been flushed, and the system 10 may fetch the data at block 162. Alternatively, where the indicated cache entry is above the current background flush algorithm address, then the entry may still exist. As such, the system 10 may initiate at block 170 a lookup using the old hash function 47. For example, the background flush algorithm 46 may begin at row 0 of a cache 44 on its way to row 1,000. The current address of the background flush algorithm 46 may be row 50, and the old hash function 47 may indicate a row between 50 and 1,000. As such, the hash function information may still be valid for the requested row. The system 10 may consequently use the old hash function 47 at block 170. Under similar circumstances, but with row 49 in question, the system 10 may acknowledge at block 168 that the row has been flushed, i.e., invalidated.

Where a cache miss occurs at block 172, the system 10 may automatically fetch the data at block 162. Where a cache hit alternatively occurs at block 172, then the system 10 may read at block 174 the cache entry. The system 10 may additionally write the data at block 176 using the new hash function 47. The system 10 may further invalidate the entry at block 178. As such, a set of data may only exist at one location within the cache 44. For example, row 75 of the cache 44, which is associated with the old hash function 47, may be invalidated (e.g., the cache entry bit may be inverted). Concurrently, new row 800 may be written using the new hash function 47 for the requested data. Ultimately, the system 10 may return the data to the requester back at block 158.

In operation, embodiments consistent with the invention may make an initial calculation more robust by counting or otherwise determining the number of times a cache 44 has been written. The hardware may store the result in a register or counter 45. The system 10 may take that number in the register and divide it by the number of rows in the cache 44. When the result is greater than a register value, e.g., set up by software, the system 10 may commence monitoring the miss rate.

Once the initial set up has been completed, and presuming that the background flush algorithm 46 is not active, the system 10 may begin recording statistics. More particularly, the system 10 may store in counters 45 the access count and cache miss information. Once the access register or counter 45 hits a maximum value, which may be set by software, the system 10 may calculate the cache miss rate. If the cache miss rate is greater than a register value, the hash function 47 may be changed in an attempt to decrease the cache miss rate. If the cache miss rate is less than the stored register value, then the system 10 may determine that it has an acceptable hit rate. The counters 45 may be cleared, and the statistic gathering for cache miss rate calculations may begin, again. The above described features may help prevent cache hashes from thrashing.

A new hash function 47 may be dynamically applied. Embodiments may include a cache entry/hash select bit recorded in each class of each cache row. The old hash function 47 may have set this bit to the same value in every entry, e.g., either a "0" or "1." The new hash function 47 may set up to use the opposite value when loading a new class in the cache.

The system may initiate a background flush algorithm 46 as soon as the new hash function 47 is applied. The background flush algorithm 46 may begin at an address, e.g., "0," of the cache 44 and continue through the entire cache 44. As the background flush reads each cache row, it may invalidate every class that is using the old hash select bit value. The background flush algorithm 46 may further write the row back to the cache. This background flush algorithm 46 may be a slow process. To this end, the system 10 may incorporate throttle logic so that not all the important information of valid cache classes is lost. Registers may control how often the background flush algorithm 46 increments its address and accesses the cache 44. When the flush algorithm 46 is complete, all entries are guaranteed to have the new hash select bit value.

Once the background flush algorithm 46 is complete, hardware may initiate calculating performance numbers using the new hash function 47. If the chosen hash function 47 is not working satisfactorily, hardware may attempt to change the hash function 47, again, at the next miscalculation time. Embodiments may detect hardware looping through hash functions 47 in order to determine if no hash actually meets the criteria. Embodiments may accomplish this task by counting the number of hash function 47 changes for a given amount of time. The hardware may then freeze the hash function 47 from changing, choosing the hash function 47 with the best statistics after looping. Software may be informed in such cases. For instance, the hardware may generate an interrupt.

While the background flush algorithm 46 is ongoing, the cache 44 may still be active. When there is more than one hash function 47 active, two lookups (using the functions 47) may be accomplished. For purposes of the specification, these lookups may be identified as new and old lookups. The new lookup may be done first and may use the new hash function 47. The new lookup may be associated with the new hit or a new miss based on comparing tag values in classes that have the new hash select bit value. When the new lookup gets a new hit, it may continue without further action, returning the hit information to the lookup requester.

If the new lookup results in a new miss, alternatively, then a decision may automatically be made on whether to perform an old lookup or not. If the old hash function 47 will cause an old lookup to a cache row that is above the current background flush row pointer, or address, then an old lookup may be performed. If the old hash function 47 may cause an old lookup to a cache row that is below the current background flash row pointer, then no old lookup may be performed. The system 10 may then treat that scenario like an old miss, as described herein.

That is, the old lookup may use the old hash function 47. An old hit or an old miss may result based on comparing the tag value in classes that have the old hash select bit value. If the old lookup/hash function 47 gets an old hit, then the system may invalidate the class that encountered the old hit, and the row may be written back to the cache 44. The old hit class information may then be loaded into one of the classes in the new lookup row. The select bit value may be changed to indicate the new hash function 47. The old hit class information may be returned to the lookup requester, thus making it unnecessary to perform a memory lookup. The row for the new lookup may be written back to the cache 44.

If the old lookup gets an old miss, the cache 44 may then fetch the required information from main storage 42. This information may be returned to the lookup requester, and loaded into one of the classes in the new lookup row. The select bit value may be set to indicate the new hash function 47. The row for the new lookup may be written back to the cache 44.

This process may continue until the background flush is complete. There may be no old lookup once the background flush is complete.

In one aspect of the invention, the system hardware may begin with a default hash function 47 to access its data. The hardware may include a number of secondary hash functions 47, as well. These functions may be programmable, hardwired or generated by some other mechanism, such as debug registers or fuses.

As traffic runs through the microchip, the current hit rate for the cache 44 may be evaluated and stored. If the hit rate is low for a long period of time, the hardware may ask a hash function 47 to retrain, or may potentially interrupt software to pick a new hash function 47. This hash function 47 retrain may use a register of some form of detection logic to pick a hash function 47 more suited to the current traffic pattern. As such, the hardware may include both a primary and at least one secondary hash function 47.

In one embodiment, the hardware may invalidate a current cache using a current hash function 47, then select and continue with a secondary hash function 47. Another embodiment may add a few extra bits to the cache 44 to indicate which hash function 47 was being used when a particular entry in the cache 44 was updated. As the hash function 47 is changed, new entries may receive the updated function 47. The old hash function 47 may continue running for some amount of time. If the old hash function 47 missed, but got a new hash location, embodiments may switch to the new hash function 47 immediately, i.e., without waiting for the switch. All new lookups may use the new hash function 47. Anything written using the old hash function 47 may miss or be updated if it results in a cache hit. The cache 44 may miss for a small amount of time, however, the cache 44 should have a smaller miss rate in the end by virtue of a more suitable hash function 47 being selected.

The retrain may walk through all the secondary hash functions 47. More particularly, the system 10 may run each function 47 for a period of time to gather statistics, or just to pick a new one and wait for a hash retrain if the performance and/or hit rate does not improve. The penalty for the changeover may be minimized so that the extra few misses are not significant and the application as a whole runs better. The selection of the hash function 47 may be best based on performance counts kept in statistic registers or a straight multiplexer function based on a configuration setting. Such embodiments may allow relatively large flexibility in design.

While the present invention has been illustrated by a description of various embodiments and while these embodiments have been described in considerable detail, it is not the intention of the Applicants to restrict, or in any way limit, the scope of the appended claims to such detail. For instance, while some of the embodiments described herein may lend themselves particularly well to hardware implementations, alternative embodiments may be realized in software, and/or may encompass known memory and disk caching practices, as well as virtual memory. Similarly, embodiments of the invention may be realized in different cache levels, among other memory resources. The invention in its broader aspects is therefore not limited to the specific details, representative apparatus and method, and illustrative example shown and described. Accordingly, departures may be made from such details without departing from the spirit or scope of Applicants' general inventive concept.

What is claimed is:

1. A computer implemented method of managing a cache using hash function, the method comprising:
   using a first hash function to access a plurality of entries in a cache;
   analyzing a performance attribute of the first hash function as the plurality of entries are accessed in the cache;
   automatically selecting a second hash function based upon the analysis of the performance attribute;
   invalidating the plurality of entries associated with the first hash function; and
   initiating a flushing algorithm configured to flush the plurality of entries associated with the first hash function while using the second hash function to access the cache.

2. The method of claim 1, further comprising analyzing a performance attribute of the second hash function.

3. The method of claim 1, wherein automatically selecting the second hash function further comprises comparing the performance attribute of the first hash function to a performance attribute of the second hash function.

4. The method of claim 1, wherein automatically selecting the second hash function further comprises selecting the second hash function using processes implemented in hardware.

5. The method of claim 1, wherein automatically selecting the second hash function further comprises comparing the performance attribute of the first hash function to a stored comparison reference.

6. The method of claim 1, further comprising providing a warm-up period for the first hash function prior to analyzing the performance attribute of the first hash function.

7. The method of claim 1, wherein analyzing the performance attribute further comprises analyzing a performance attribute relating to and selected from a group consisting of at least one of an access attempt, a cache miss and a cache hit.

8. The method of claim 1, further comprising determining if an entry of the cache that is correlated to an old hash function has been flushed.

9. The method of claim 1, further comprising automatically and subsequently switching back to using the first hash function.

10. The method of claim 1, further comprising determining if using the second hash function results in a cache hit; and if not, using the first hash function.

11. The method of claim 1, further comprising determining a status of the flushing algorithm, and based on the status, selectively using either the first hash or the second hash to access the cache.

12. The method of claim 11, wherein the status is associated with at least one of a pointer and whether the flushing algorithm is active.

13. An apparatus, comprising:
   a cache including a plurality of entries; and
   a processor in communication with the cache and configured to initiate a use of a first hash function to access the plurality of entries in the cache, to initiate an analysis of a performance attribute of the first hash function as the plurality of entries are accessed in the cache, to invalidate the plurality of entries associated with the first hash function, to initiate an automatic selection of a second hash function based upon the analysis of the performance attribute, and to initiate a flushing algorithm configured to flush the plurality of entries associated with the first hash function while using the second hash function to access the cache.

14. The apparatus of claim 13, wherein the processor is further configured to compare the performance attribute of the first hash function to a performance attribute of the second hash function.

15. The apparatus of claim 13, wherein the processor is further configured to provide a warm-up period for the first hash function prior to analyzing the performance attribute of the first hash function.

16. The apparatus of claim 13, wherein the performance attribute is selected from a group consisting of at least one of an access attempt, a cache miss and a cache hit.

17. The apparatus of claim 13, wherein the processor is further configured to determine if an entry of the cache that is correlated to an old hash function has been flushed.

18. The apparatus of claim 13, wherein the processor is further configured to determine if using the second hash function results in a cache hit, and if not, using the first hash function.

19. The apparatus of claim 13, further comprising a loop counter storing a number of times that the first hash function and the second hash function have been used.

20. A program product, comprising:
program code configured to initiate a use of a first hash function to access a plurality of entries in a cache, to initiate an analysis of a performance attribute of the first hash function as the plurality of entries are accessed in the cache, to invalidate the plurality of entries associated with the first hash function, to initiate an automatic selection of a second hash function based upon the analysis of the performance attribute; and to initiate a flushing algorithm configured to flush the plurality of entries associated with the first hash function while using the second hash function to access the cache; and
a non-transitory computer readable medium bearing the program code.

* * * * *